United States Patent
Shaeffer

(10) Patent No.: US 8,380,943 B2
(45) Date of Patent: Feb. 19, 2013

(54) VARIABLE-WIDTH MEMORY MODULE AND BUFFER

(75) Inventor: Ian P. Shaeffer, Los Gatos, CA (US)

(73) Assignee: Rambus Inc., Sunnyvale, CA (US)

( * ) Notice: Subject to any disclaimer, the term of this patent is extended or adjusted under 35 U.S.C. 154(b) by 313 days.

(21) Appl. No.: 12/808,662

(22) PCT Filed: Jan. 7, 2009

(86) PCT No.: PCT/US2009/030361
§ 371 (c)(1),
(2), (4) Date: Jun. 16, 2010

(87) PCT Pub. No.: WO2009/089301
PCT Pub. Date: Jul. 16, 2009

(65) Prior Publication Data
US 2011/0138133 A1    Jun. 9, 2011

Related U.S. Application Data

(60) Provisional application No. 61/019,533, filed on Jan. 7, 2008.

(51) Int. Cl.
*G06F 12/00*    (2006.01)
(52) U.S. Cl. ........................ 711/154; 711/147
(58) Field of Classification Search ............... 711/154, 711/147
See application file for complete search history.

(56) References Cited

U.S. PATENT DOCUMENTS

| 7,809,913 | B2* | 10/2010 | Bartley et al. .......... 711/167 |
| 2004/0256638 | A1* | 12/2004 | Perego et al. .......... 257/200 |
| 2005/0108469 | A1* | 5/2005 | Freeman et al. .......... 711/105 |
| 2005/0182885 | A1 | 8/2005 | Matsui et al. .......... 710/307 |
| 2006/0112230 | A1* | 5/2006 | Sichert et al. .......... 711/137 |
| 2007/0162668 | A1 | 7/2007 | Shaeffer .......... 710/68 |
| 2008/0183959 | A1* | 7/2008 | Pelley et al. .......... 711/109 |
| 2009/0006775 | A1* | 1/2009 | Bartley et al. .......... 711/154 |

FOREIGN PATENT DOCUMENTS

WO    WO 2004/051484 A2    6/2004

OTHER PUBLICATIONS

International Search Report and Written Opinion issued in PCT/US2009/030361, Apr. 28, 2009, 10 pages by ISA/EP.
International Preliminary Examination Report dated Apr. 14, 2011 re Int'l. Application No. PCT/US09/30361. 4 Pages.

\* cited by examiner

*Primary Examiner* — Hashem Farrokh
(74) *Attorney, Agent, or Firm* — Morgan, Lewis & Bockius LLP

(57) ABSTRACT

A memory module having a plurality of memory devices and a memory buffer that translates between a variable width primary data port and a plurality of fixed width secondary data ports, each of which is coupled to one of the memory devices. The translation is effected by distributing the width of the primary data port to all or to a subset of the secondary data ports. In another aspect, the invention comprises a memory buffer that supports adjustable data width in a variety of ways.

22 Claims, 5 Drawing Sheets

VARIABLE-WIDTH MEMORY MODULE AND BUFFER

CROSS REFERENCE TO RELATED APPLICATIONS

This Application is a United States National Stage Application filed under 35 U.S.C. §371 of PCT Patent Application Serial No. PCT/US2009/030361 filed on Jan. 7, 2009, which claims the benefit of and priority to U.S. Provisional Patent Application Ser. No. 61/019,533 filed on Jan. 7, 2008, both of which are hereby incorporated by reference in their entireties.

FIELD OF THE INVENTION

This relates to memory system architectures and the memory modules used in memory systems.

BACKGROUND OF THE INVENTION

Traditional module-based memory systems are configured in a multi-drop topology in which multiple memory modules are electrically connected to the same set of signaling wires. Unfortunately, multi-drop topologies suffer from limitations in signaling speeds due to reflections from each of the transmission line stubs created by the module interconnections, as well as the increasing capacitive load as each module is added to the system.

Point-to-point signaling topologies generally enable higher signaling rates than multi-drop arrangements and are increasingly employed between memory controller and memory modules in high-performance memory systems. Capacity-expansion (i.e., adding memory modules) in such memory systems is a challenge, however, as each added memory module typically requires an additional dedicated set of point-to-point links, which are a resource proliferation that sets a practical limit on the number of supportable memory modules.

In some cases (e.g., with fully-buffered dual inline memory-modules (FB-DIMMs)), each module is daisy-chained to the next in order to maintain point-to-point signaling. In these arrangements, data is received on a module from one point-to-point link and then repeated to the next module on the chain through another point-to-point link. In this manner, the point-to-point signaling is maintained without a large quantity of signaling links at the memory controller. However, an expense is incurred in the form of much higher latency, which is a performance penalty that worsens with each module added to the system due to the increasing number of "hops" required to reach the furthest memory module.

In newly developed dynamic point-to-point systems, storage-capacity upgrades are enabled without undue proliferation of signaling links by permitting a memory controller to connect to either i) a single memory module via an N-bit wide point-to-point signaling path, or ii) multiple (M) memory modules via respective N/M-bit wide point-to-point signaling paths. As an example of this approach, an N-bit wide point-to-point signaling path initially dedicated to a single memory module may be subdivided into multiple smaller point-to-point signaling paths as memory modules are added, with each of the smaller paths dedicated to a respective memory module and with the individual data I/O width for each memory device on a given module being configured to have an effective width according to the number of point-to-point links allocated to the module. For example, in a single module configuration, N signaling links may be distributed to X memory devices on the module with the interface width for each memory set to N/X. When that same system is expanded to support two memory modules (i.e., M=2), N/2 signaling links are dedicated to each memory module, with the interface width for each memory device set to (N/2)/X, or half the width of the single-module configuration.

Unfortunately, while specialized memory devices having such selectable interface widths have been developed, more prevalent conventional memory devices have fixed widths and thus are generally limited to use in conventional multi-drop memory systems or point-to-point systems that do not have dynamic point-to-point expansibility.

BRIEF DESCRIPTION OF THE DRAWINGS

In the following Detailed Description.

DETAILED DESCRIPTION

U.S. Provisional patent application 61/019, 533, filed Jan. 7, 2008, is hereby incorporated by reference in its entirety.

Methods and apparatuses are disclosed below in various embodiments for supporting adjustable data width while using standard memory technology having a fixed data width. For example, in one embodiment, a buffer integrated circuit (IC) having a configurable-width module-interface and one or more fixed-width memory-device interfaces is deployed on a memory module. The configurable-width module-interface is coupled, via signal traces or other conductive structures, to a connector interface of the memory module and thus enables the memory module to transmit and receive data via a configurable number of signaling lines. Each of the one or more fixed-width memory device interfaces is coupled to a respective fixed-width memory device (or group of fixed-width memory devices), and multiplexing circuitry within the buffer IC steers data flowing into the memory module to appropriate memory devices, serializing or deserializing such data according to the number of recipient memory devices and the signaling link ratio between the module interface and the device interfaces. The multiplexing circuitry performs a converse serializing/deserializing operation between the module interface and device interfaces for data flowing out of the memory module.

Figure 1:
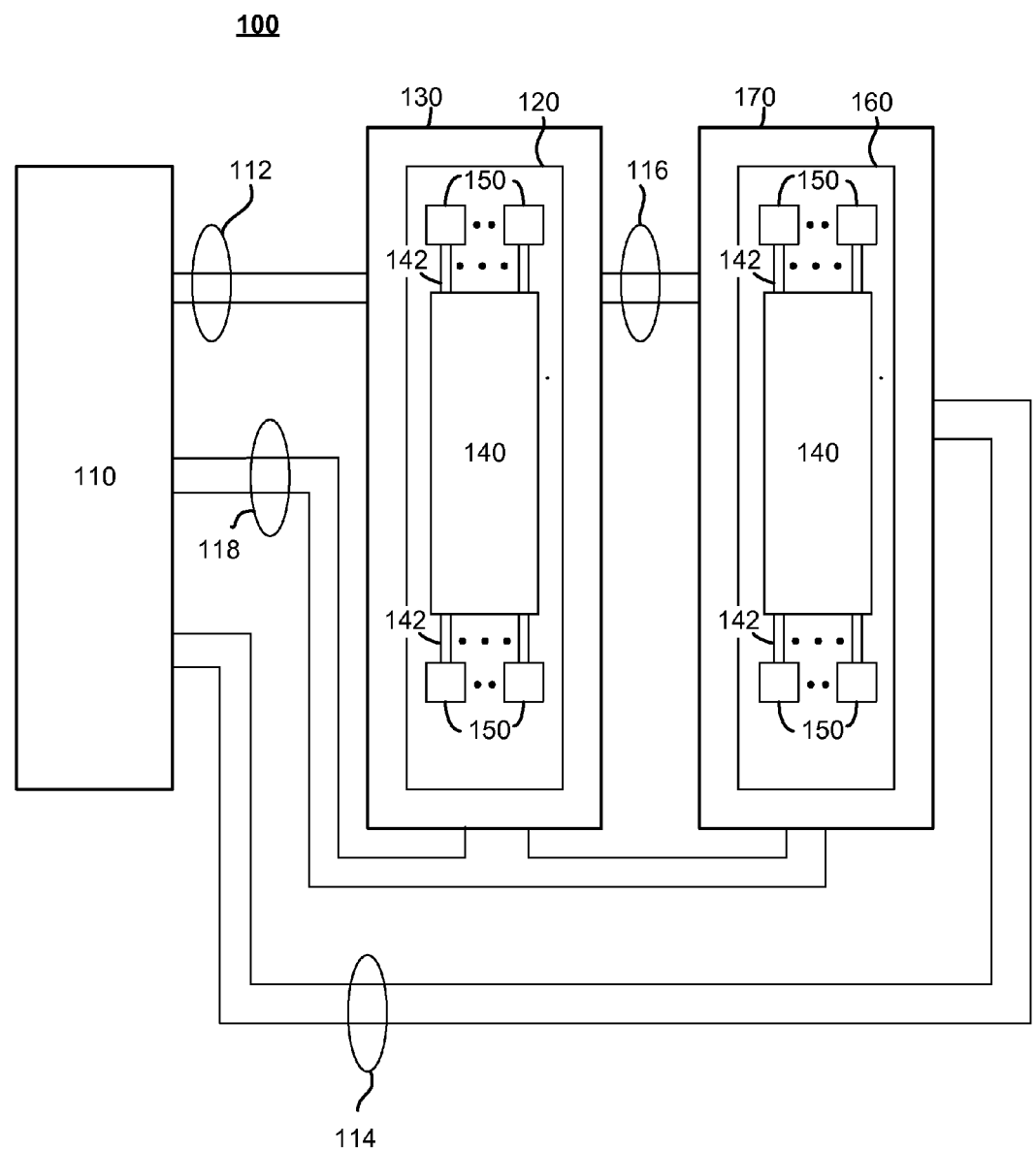
FIG. 1 is a block diagram of an illustrative embodiment of a memory system.

FIG. 1 is a schematic illustration of an embodiment of memory system 100 having memory modules that support configurable (adjustable) data widths despite being populated with fixed-width memory devices. System 100 comprises a memory controller 110 and first and second memory modules 120, 160, each of which is mountable in a connector/socket interface 130, 170. Each memory module comprises several integrated circuits that include a buffer 140 and a plurality M of fixed-width memory devices 150 connected to the buffer by signal lines 145. The fixed-width memory devices 150 may include, for example and without limitation, DRAMS, SRAMS, SDRAMS, Flash RAM and/or ROMS. A plurality of signal lines or traces 112, 114 and 116 extend between memory controller 110 and connector/socket interfaces 130, 170. More specifically, a first set of N data lines 112 extends to first electrical connector 130, a second set of N data lines 114 extends to second electrical connector 170, and a third set of N data lines 116 extends between connectors 130 and 170. In addition to the N data lines, a set of K command/address (C/A) lines 118 extends in a bus topology between memory controller 110 and connector/socket interfaces 130, 170.

In the single-module configuration, a continuity module (not shown) is inserted into connector 170 in lieu of memory module 160. The continuity module connects respective data lines within the set of data lines 114 with corresponding data lines within the set of data lines 116. By this arrangement, data line sets 114 and 116 are electrically connected to form a composite set of data lines (not shown) with each set of data lines constituting a segment of the composite set. Data line set 112 and the composite set of data lines thus form, collectively, a 2N-bit wide point-to-point data path between the memory controller 110 and memory module 120. In a dual-module configuration, controller 110 communicates with module 120 via lines 112 and with module 160 via lines 114; the third set of data lines 116 is not used. Thus, 2N data lines are coupled between the memory controller 110 and a single memory module 120 in the single-module configuration, and respective sets of N data lines (112 and 114) are coupled between the memory controller and memory modules 120 and 160 in the dual-module configuration (i.e., N data lines coupled to each memory module).

In some embodiments, signal line sets 112, 114, 116 may include both data lines and command/address lines. In the single-module configuration of this embodiment, both the data path width and the command/address path width are doubled. Also, in some embodiments, the command/address lines may be multiplexed with command and address information, or dedicated command and address paths may be formed by respective sets of lines therein. Further, commands, addresses or both may be multiplexed onto the data lines so that no separate command and/or address path is needed.

A major function of buffers 140 in memory modules 120 and 160 is to perform data-width translation that allows modules 120 and 160 to vary the effective width of the memory interfaces that connect to controller 110 without varying the width of the memory interfaces that extend between the buffers 140 and associated fixed-width memory devices 150. Memory system 100 thus supports single and dual-module point-to-point memory configurations that each make use of both sets of lines 112 and 114 from controller 110.

Figure 2:
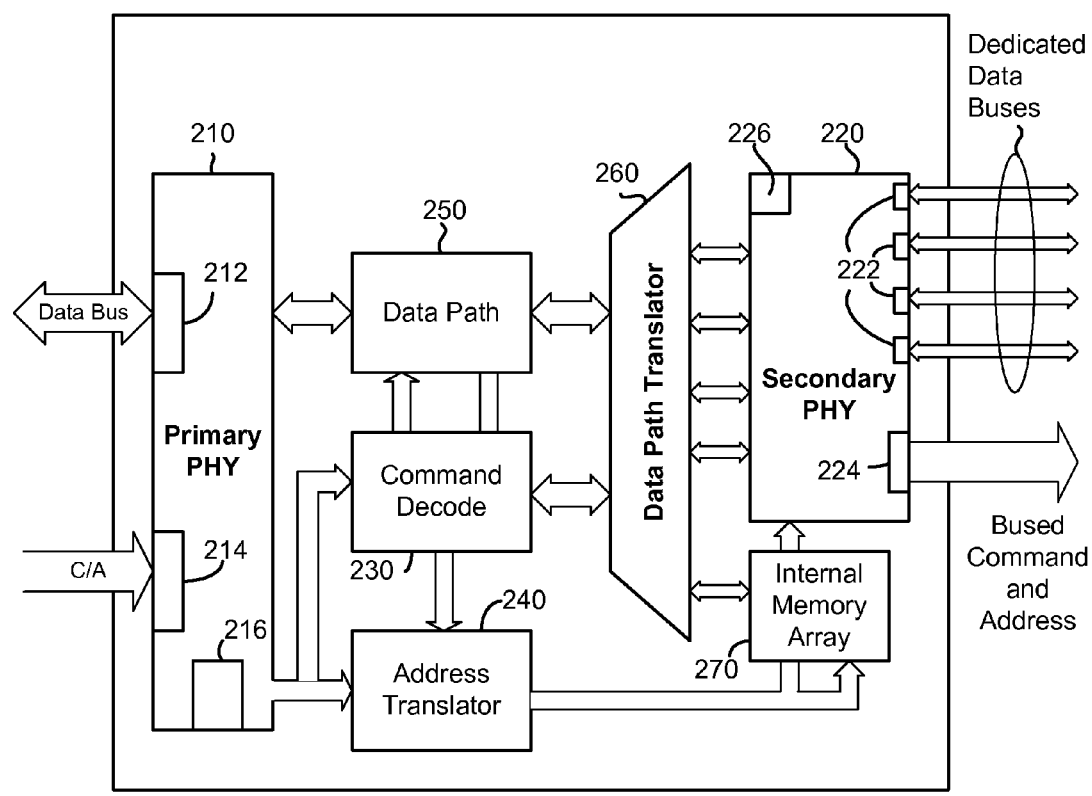
FIG. 2 is a block diagram of an illustrative embodiment of a buffer memory used in the memory system of FIG. 1.

FIG. 2 schematically depicts in block diagram form an embodiment of buffer 140 that performs bidirectional data width translation. Buffer 140 comprises a primary physical layer interface circuit (primary PHY) 210 for coupling to the memory controller 110 (FIG. 1), a secondary physical layer interface circuit (secondary PHY) 220 for coupling to the memory devices 150 (FIG. 1), a command decoder 230, an address translator 240, a data path 250, a data path translator 260, and an internal memory 270. Buffer 140 may include additional elements to perform other buffering functions, but such elements are not illustrated because they are not needed to understand the operation of the present invention. Preferably, buffer 140 supports a wide variety of memory technologies including, but limited to, DDR, DDR2, DDR3, GDDR.

Primary interface circuit 210 includes a variable-width primary data port 212, a primary command and address (C/A) port 214 and a primary configuration memory 216. Primary data port 212 is connected to the data lines (e.g., data lines 112, 114 and 116) that connect to memory controller 110; and C/A port is connected to the C/A lines 118. Secondary physical layer interface circuit 220 includes M secondary data ports 222, a secondary C/A port 224, and a secondary configuration memory 226. Each secondary data port 222 is connected by a dedicated bus to a unique memory device 150 on the module 120 or 160 and the secondary C/A port 224 is connected by a single bus to each and every memory device 150 to which the secondary data ports 222 are connected. In an alternative embodiment, multiple secondary C/A ports 224 can be provided with each secondary C/A ports 224 connected to a different memory device 150 or to a different group of memory devices 150.

Primary configuration memory 216 stores one or more bits indicating the number of data lines that have been made available to the memory module for the transmission of data. For example, for the case where the memory system has only single-module and dual module configurations, a single-bit value can be stored in memory 216 and set to a logic '1' state to indicate that 2N data lines are available (single-module configuration) and to a logic '0' state to indicate that N data lines are available (dual-module configuration). Where the memory system has more than two module configurations, multiple bit values are stored in memory 216. Secondary configuration memory 226 stores sufficient bits to indicate the number of data ports 222 and their data widths. If the data width at each port is the same, this need only be indicated once.

Preferably, both the primary configuration memory 216 and the secondary configuration memory 226 are programmable so that the buffer can support a variety of types and numbers of memory devices. Thus, the secondary configuration memory 226 might be programmed at the time the memory module was produced to indicate the number of memory devices connected to the secondary data ports and the data width of each port. Such production programmability can be provided by a memory that uses fusible circuits or other one-time-programmable circuits.

To permit the user of the memory modules 120 and 160 to incorporate the memory modules in a variety of memory systems, the primary configuration memory 216 preferably is user programmable at least at the time the memory system is assembled. Such user programmability can also be provided by a primary configuration memory 216 that uses fusible circuits or other one-time-programmable circuits.

Advantageously, the primary configuration memory 216 is also programmable during run-time. For example, during power-up of memory system 100, memory controller 110 might poll the system to determine the number of memory modules 120 and 160 that are connected. When the number has been determined, the memory controller 110 then writes that number into the primary configuration memory 216 of each memory module 120 and 160 to which it is connected.

Figure 3:
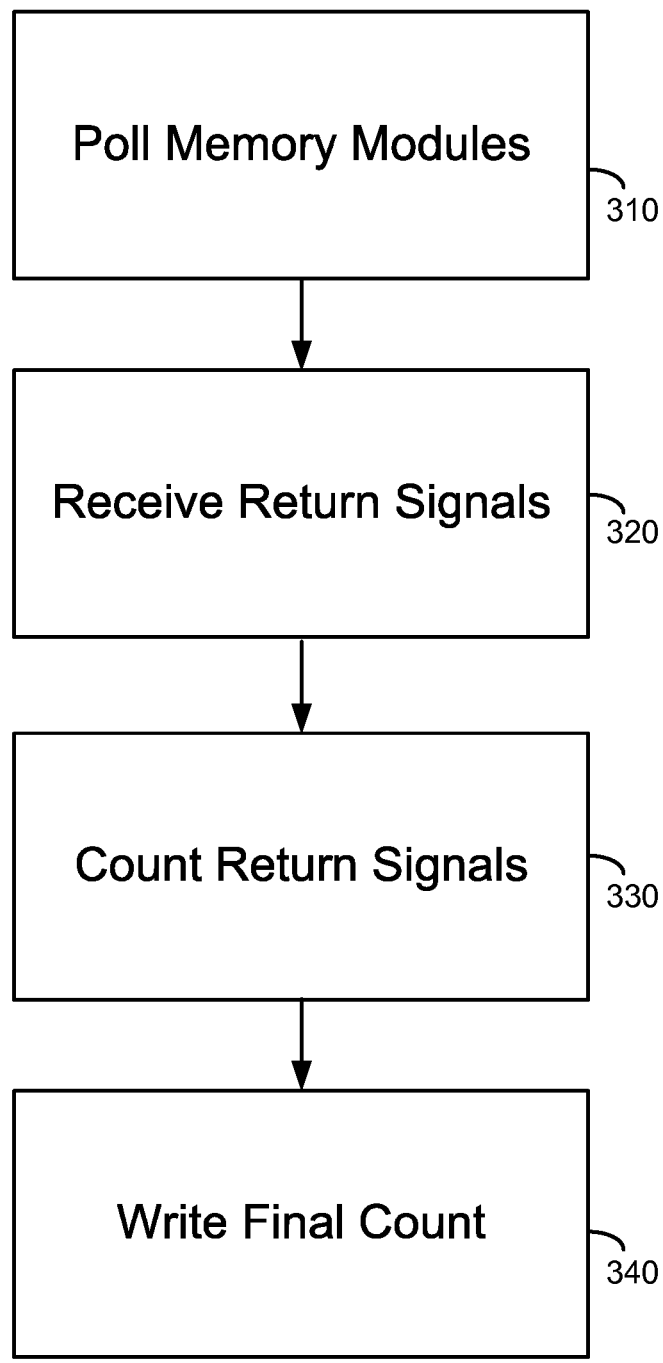
FIG. 3 is a flowchart of an illustrative embodiment of a polling process that may be used in the memory system.

FIG. 3 is a flowchart depicting an illustrative polling process. At step 310, the memory controller 110 sends a message via one of the command/address lines 118 to all memory modules 120 and 160 connected to those lines requesting the modules to signify their connection by a return signal. At step 320, the return signals are received at the memory controller 110 from each of the connected memory modules 120 and 160. As the return signals are received, the memory controller 110 counts the signals at step 330. Finally, at step 340 the memory controller 110 writes the final counts into the primary configuration memory 216 in each memory module 120 and 160 to which it is connected.

The interfaces and ports described herein may be viewed as having both a physical width and a logical width. The physical width of an interface or port is the number of signal line input and/or output (I/O) nodes physically provided for coupling to an external signaling link. By contrast, the logical width of an interface or port is that number of signal I/O nodes actually used for signal transfer during run-time operation, regardless of whether coupled to external signaling links. For example, while the primary interface circuit 210 may have some number (N) of I/O nodes to couple to external signaling links and thus have an N-bit physical width, only a limited portion (X) of those nodes may be configured to drive/receive signals in a particular configuration (e.g., a dual module configuration), so that the X-bit logical width of the interface is less than the N-bit physical interface. More generally, X may range from zero to N according to the desired logical width of the interface circuit. Also, in some cases, two or more interface circuits may be operated collectively (as a unit) to provide an effective logical width greater than the physical width of either interface alone.

Command decoder 230 interprets incoming command and control information from primary interface circuit 210 and sends control information to other blocks in the buffer 140. Internal memory 270 provides memory for various buffer functions.

Address translator 240 permits buffer 140 to support various addressing features of memory controller 110. As an example, one of the functions of the address translator 240 is to map the address received by the primary PHY 210 to one or more memory devices (e.g. memory device 150 of FIG. 1). For instance, if there are two possible memory devices to access and (at full width) both are accessed simultaneously, the chip select from the primary PHY 210 is simply mapped to the chip selects of both memory devices on the secondary PHY 220. In a half-width mode, the address translator 240 translates one of the incoming address bits (for instance, a low order row address bit) into one or the other memory devices chip select. In one embodiment, odd row addresses would access a first memory devices while even row addresses would access a second memory devices.

In another embodiment, the primary PHY 210 may have two chip select inputs. By this arrangement, in a full width configuration in which two memory devices are to be accessed as a unit, a single one of the chip select inputs (or possibly both chip select inputs driven simultaneously) may be used to access the two-memory device unit. By contrast, in a half-width mode, the two chip select inputs may be dedicated to respective memory devices, thus enabling independent access to each memory devices. The address translator 240 is the logic block that deals with these modes and mappings.

The translation itself may be programmable—in other words, which bit or combination of bits is used to determine the chip selects on the secondary phy can be varied.

Data from the memory controller is transmitted from the primary PHY 210 to the secondary PHY 220 through data path 250 and data path translator 260. The data path translator 260 steers the data to a particular data port on secondary PHY 220 during a write operation and routes data from the secondary data ports 222 of the secondary PHY 220 to the primary PHY 210 during a read operation.

Figure 4:
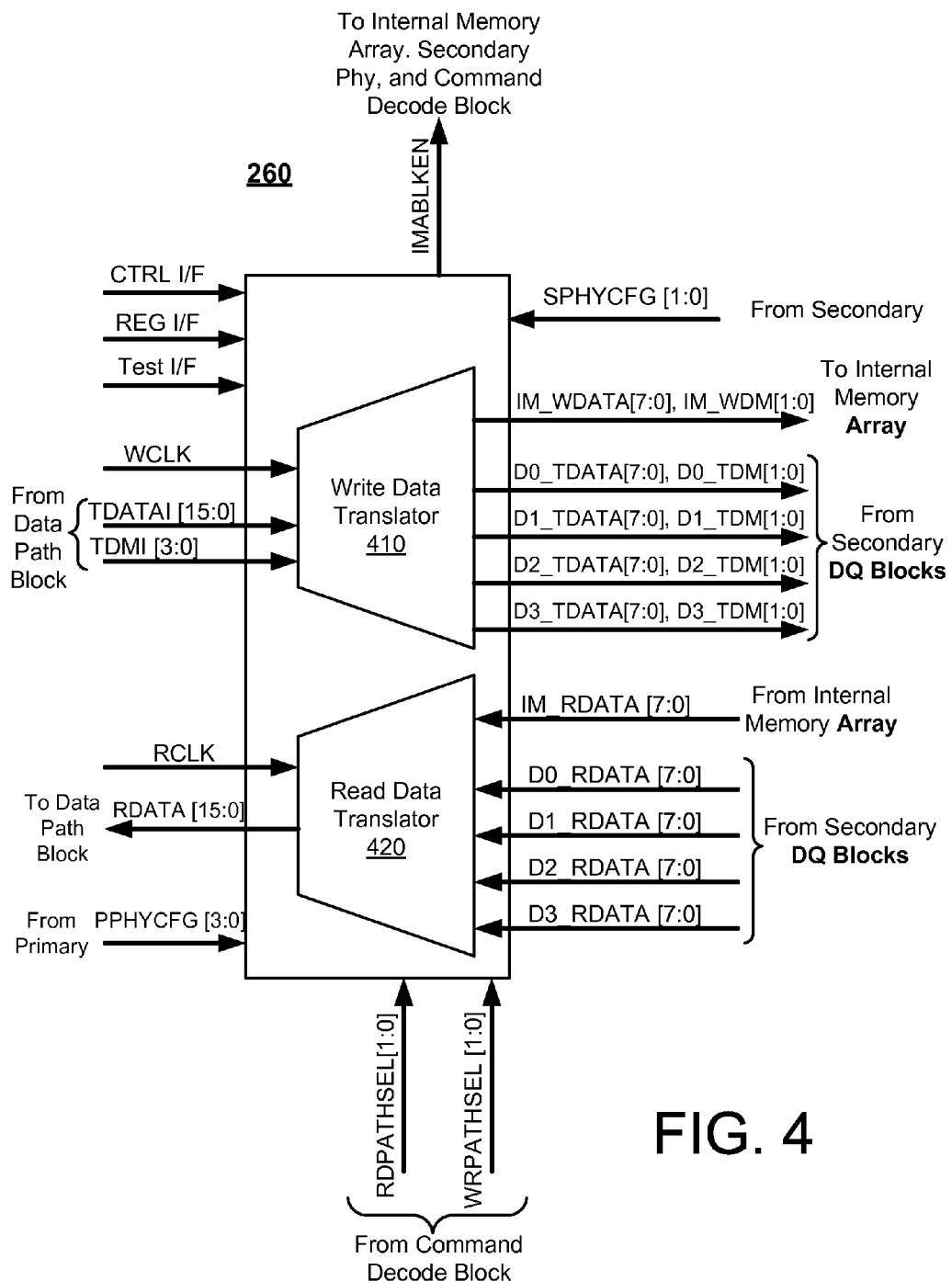
FIG. 4 is a block diagram of an illustrative embodiment of an element of the buffer memory of FIG. 2.

FIG. 4 is a schematic block diagram of the data path translator 260 according to one embodiment. Data path translator 260 comprises a write data translator 410 and a read data translator 420. During normal operation, the data path translator 260 receives write data from data path 250 and routes the data to one or more of M secondary data ports 222 in the secondary PHY 220. Similarly on read transactions, data is received from one or more of the M secondary data ports 222 in the secondary PHY 220 and routed to data path 250.

The appropriate routing path is specified by the RDPATH-SEL and WRPATHSEL select signals from command decoder 230 and the PPHYCFG and SPHYCFG configuration signals from the primary and secondary configuration memories 216 and 226, respectively, in the primary and secondary PHYs 210 and 220, respectively. The PPHYCFG signal indicates the width of the data signal at the primary PHY 210 and the SPHYCFG indicates the number of data ports 222 and their data widths at the secondary PHY 220. This allows the data path translator 260 to support a number of flexible buffer configurations with regard to the count and type of memory devices supported.

In one embodiment, variations in the data width at the variable width data port 212 are accommodated by adjusting the number of memory devices 150 accessed in each data transaction. Thus, if Wp is the primary data width at the primary data port 212 and Wm is the data width of a memory device 150 and the data rate at the primary and secondary PHYs 210 and 220, respectively, is the same, the number of memory devices 150 accessed in each data transaction is Wp/Wm. Thus, if the primary data port 212 has a data width of 64 and each memory device 150 has a data width of 8, then the number of memory devices 150 that may be accessed in each data transaction is 8. If, however, the primary data port 212 has a data width of 32, then the number of memory devices 150 that may be accessed in each data transaction is 4. And if the data width of the primary data port 212 is 16 or 8, then the number of memory devices 150 that may be accessed would be 2 or 1, respectively. Thus, for different primary data widths, different numbers of memory devices 150 may be accessed.

As suggested above, the data rates at the primary and secondary interface circuits need not be the same. If Fp is the date rate at the primary interface circuit and Fm is the data rate at the secondary interface circuit, the number of memory devices accessed in each data transaction is (Fp*Wp)/(Fm*Wm). In some embodiments, the data rate at the primary interface circuit is an integer multiple of the data rate at the secondary interface circuit. In some embodiments, the number of secondary data ports corresponds to the integer multiple.

To enable the width adjustment, the PPHYCFG configuration signal from the primary configuration memory 216 in the primary data PHY 210 specifies the data width at the primary data port 212 and the SPHYCFG signal from the secondary configuration memory 226 in the secondary PHY 220 specifies the number and the data widths of the memory devices. Where different data rates are also available for use, the PPHYCFG and SPHYCFG configuration signals also specify which of these rates is being used. From this data, the translator determines the number of memory devices 150 needed to accommodate the specified primary data width and routes the data to that number of secondary data ports 222 and on to the devices.

In one embodiment, this determination is made from a look-up table that specifies for each possible combination of PPHYCFG and SPHYCFG signals the routing needed to route the data from the primary data port 212 to the secondary data ports 222.

Figure 5:
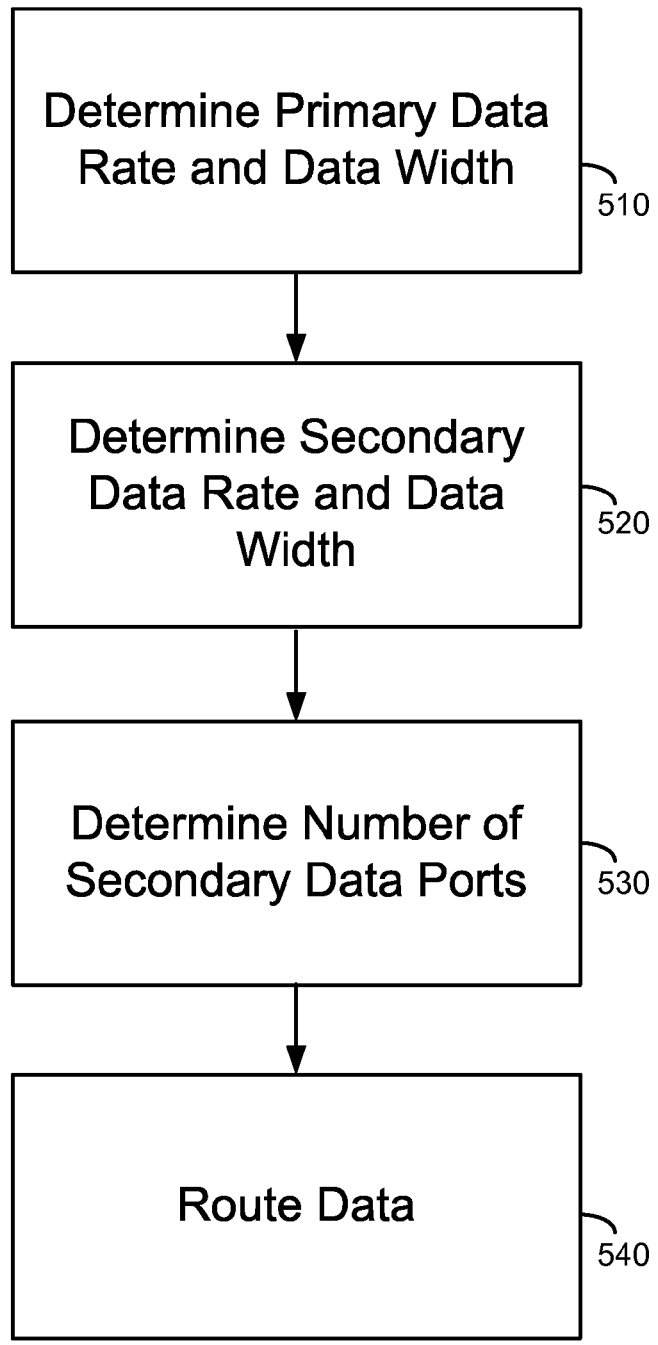
FIG. 5 is a flowchart of an illustrative embodiment of a method of operating the memory system of FIG. 1.

FIG. 5 is a flowchart depicting the routing function. At step 510, the data rate and data width at the primary data port 212 are determined, and at step 520 the data rate and data width at the secondary data port 222 are determined. This information is then used at step 530 to determine the number of secondary data ports 222 needed and the routing to the secondary data ports 222 selected to meet this need. The data from the primary data port 212 is then routed to the selected secondary data ports 222 at step 540.

Advantageously, buffer 140 may also have additional operating modes, thereby providing the module designer with greater design flexibility and increasing the market for the buffer 140. A second such mode usable with variable width memory devices provides for translation between a variable width primary data port and variable width secondary data port. In this mode, the data router receives from the primary PHY 210 a configuration signal indicating the data width at the primary PHY 210 and distributes that data according to a predetermined schedule to the secondary data ports 222. Since the memory devices in this embodiment are variable width devices, the data width allocated to each memory device can vary from none to the maximum width available. Typically, however, reductions in the primary data width are apportioned equally. In such cases, for different primary data widths, different portions of the data width of variable width memory devices are accessed.

A third mode provides for translation between a variable width primary data port and fixed width secondary data ports using a time-slicing technique disclosed in co-pending U.S. patent application Ser. No. 11/292,407, filed Nov. 30, 2005 and entitled "Variable-Width Memory Module With Fixed-Width Memory Die." U.S. patent application Ser. No. 11/292,407 is hereby incorporated by reference in its entirety. As an example, in one embodiment, a memory buffer is equipped with a primary data port that supports at least first and second numbers of signal links, and multiple secondary data ports each for coupling to a respective memory device. A data translator is provided to route data between the primary data port and the secondary data ports and may support at least two of the following operating modes: (i) a first mode in which the data translator supports a first configuration that routes data between the first number of signal links and a first number of the plurality of secondary data ports and a second configuration that routes data between the second number of signal links and a second number of the plurality of secondary data ports; (ii) a second mode in which the data translator supports a third configuration that routes data between the first number of signal links and a first portion of each secondary data port and a fourth configuration that routes data between the second number of signal links and a second portion of each secondary data port; and (iii) a third mode in which burst length utilization at the secondary data ports varies with the number of signal links supported by the primary data port as in one or more embodiments disclosed in U.S. patent application Ser. No. 11/292,407.

Additional modes of operation permit the combination of any two or all three of the modes of operation previously described. Thus, a fourth mode of operation combines the first two modes, a fifth mode combines the first and third, an sixth mode combines the second and third and a seventh mode combines the first, second and third modes.

The operation of the first three modes is summarized in Table I for the case where the data width at the primary PHY 210 can range from 64 to 8, there are 8 memory devices 150 each having a data width of 8, and the data rates of the primary and secondary PHYs 210 and 220, respectively, are equivalent. Each halving of the data width at the primary PHY 210 can be accommodated by halving the number of fixed width memory devices 150 that are accessed as in mode 1 or by halving the access time as in mode 3. If the memory devices 150 are variable width devices, each halving of the primary data width can also be accommodated by halving the width of all the memory devices 150 as in mode 2.

TABLE I

| primary data width | mode 1-# devices | mode 2-memory device width | mode 3-burst length utilization |
|---|---|---|---|
| 64 | 8 | 8 | 100% |
| 32 | 4 | 4 | 50% |
| 16 | 2 | 2 | 25% |
| 8 | 1 | 1 | 12.5% |

Moreover, the modes can be combined. Thus, if variable width memory devices are used, the buffer 140 can accommodate a reduction in the data width from 64 to 8 by halving the number of memory devices accessed, halving their data width and halving their access time. Alternatively, only mode 1 or mode 3 could be used with mode 2. And if only fixed width memory devices are available, then such a reduction can be achieved by reducing the number of devices accessed by 75% and the access time by half or by reducing the number of devices accessed by half and the access time by 75%.

While the present invention has been described in connection with specific embodiments, numerous variations and combinations of these embodiments may be practiced including, for example and without limitation:

1. The concepts detailed above can be extended to any combination of external and internal data widths.

2. Memory die in accordance with some embodiments can be soldered directly to a board and either permanently or programmably configured to a particular width. Such arrangements, particularly for systems in package (SIP) embodiments, facilitate the creation of single packaged components configured as any of several data widths.

3. Data-width translation logic can be incorporated into a buffer shared among multiple memory die on a module, or may be distributed throughout multiple smaller buffers that each support one or a subset of memory die on a module.

4. Data-width translation logic can be provided on the motherboard, and possibly integrated with a memory controller, instead of included on the module with the fixed-width die.

Moreover, some components are shown directly connected to one another while others are shown connected via intermediate components. In each instance the method of interconnection, or "coupling," establishes some desired electrical communication between two or more circuit nodes, or terminals. Such coupling may often be accomplished using a number of circuit configurations, as will be understood by those of skill in the art. Therefore, the spirit and scope of the appended claims should not be limited to the foregoing description. Only those claims specifically reciting "means for" or "step for" should be construed in the manner required under the sixth paragraph of 15 U.S.C. Section 112.

What is claimed is:

1. A memory module comprising:
a plurality of memory devices; and
a memory buffer including:
    a primary data port that supports a variable number of data signal links;
    a plurality of secondary data ports coupled respectively by point-to-point links to the memory devices, each secondary data port coupled to a fixed number of data signal lines; and
    a secondary configuration memory for storing a value indicating the number of secondary data ports coupled by point-to-point links to the memory devices; and
    a data translator that routes data between the primary data port and a number of the secondary data ports that varies in accordance with the value indicating the number of secondary data ports stored in the secondary configuration memory and as a function of the number of data signal links available to the memory module for transmitting data through the primary data port;

wherein a first subset of secondary data ports is associated with the value stored in the secondary configuration memory when the primary data port supports a first number of signal links and a second subset of secondary data ports is associated with the value stored in the secondary configuration memory when the primary data port supports a second number of signal links, and the second subset is different from the first subset.

2. The memory module of claim 1 further comprising a primary configuration memory for storing an indication of the number of data signal links available at the primary data port.

3. The memory module of claim 1 wherein the secondary configuration memory further stores an indication of the number of data signal lines coupled to each secondary data port.

4. The memory module of claim 1 wherein each secondary data port is coupled to the same number of data signal lines.

5. The memory module of claim 1 wherein data is transmitted at a first rate through the primary data port and transmitted at a second rate through at least one of the secondary data ports, the first rate being different from the second rate.

6. The memory module of claim 5 wherein the first rate is an integer multiple of the second data rate.

7. The memory module of claim 6 wherein the number of secondary data ports corresponds to the integer multiple.

8. A memory module comprising:
a plurality of memory devices; and
a memory buffer comprising:
    a primary data port capable of supporting at least first or second numbers of data signal links;
    a plurality of secondary data ports coupled respectively by point-to-point links to the memory devices, each secondary data port supporting at least one data signal link;
    a secondary configuration memory for storing a value indicating the number of secondary data ports coupled by point-to-point links to the memory devices; and
    a data translator that routes data between the primary data port and a first subset of the secondary data ports when the primary data port supports the first number of data signal links and between the primary data port and a second subset of the secondary data ports when the primary data port supports the second number of data signal links;
wherein the first subset of secondary data ports is associated with the value stored in the secondary configuration memory when the primary data port supports the first number of signal links and the second subset of secondary data ports is associated with the value stored in the secondary configuration memory when the primary data port supports the second number of signal links.

9. The memory module of claim 8 further comprising a primary configuration memory for storing an indication of the number of data signal links available at the primary data port.

10. The memory module of claim 8 wherein the secondary configuration memory further stores an indication of the number of data signal lines coupled to each secondary data port.

11. The memory module of claim 8 wherein each secondary data port is coupled to the same number of data signal links.

12. The memory module of claim 8 wherein data is transmitted at a first rate through the primary data port and transmitted at a second rate through at least one of the secondary data ports, the first rate being different than the second rate.

13. A memory module comprising:
a plurality of memory means; and
a memory buffer comprising:
    first data support means capable of supporting at least first or second numbers of data signal links;
    a plurality of second data support means coupled respectively by point-to-point links to the memory means, each second data support means supporting at least one data signal link;
    a secondary configuration memory means for storing a value indicating the number of second data support means coupled to memory means; and
    means for routing data between the first data support means and the plurality of second data support means, such that data is routed between the first number of data signal links and a first subset of second data support means or between the second number of data signal links and a second subset of second data support means;
wherein the first subset of second data support means is associated with the value stored in the secondary configuration memory when the first support means supports the first number of signal links and the second subset of second data support means is associated with the value stored in the secondary configuration memory when the first data support means supports the second number of signal links.

14. The memory module of claim 13 further comprising a primary configuration memory means for storing an indication of the number of data signal links available at the first data support means.

15. The memory module of claim 13 wherein the secondary configuration memory means further includes means for storing an indication of the number of data signal links available at each second data support means.

16. The memory module of claim 13 wherein each second data support means is coupled to the same number of data signal links.

17. The memory module of claim 13 wherein data is transmitted at a first rate through the first data support means and transmitted at a second rate through at least one of the second data support means, the first rate being different than the second rate.

18. A memory buffer comprising:
a primary data port supporting at least first and second numbers of signal links;
a plurality of secondary data ports for coupling by point-to-point links to memory devices;
a secondary configuration memory for storing a value indicating a number of the secondary data ports coupled by point-to-point links to memory devices; and
a data translator that routes data between the primary data port and a first subset of the secondary data ports when the primary data port supports the first number of signal links and between the primary data port and a second subset of the secondary data ports when the primary data port supports the second number of data signal links;
wherein the first subset of secondary data ports is associated with the value stored in the secondary configuration memory when the primary data port supports the first number of signal links and the second subset of secondary data ports is associated with the value stored in the secondary configuration memory when the primary data port supports the second number of signal links.

19. The memory buffer of claim 18 further comprising a primary configuration memory for storing an indication that the primary data port is supporting the first number of data signal links or the second number of data signal links.

20. The memory buffer of claim 18 wherein the secondary configuration memory further stores an indication of the number of data signal links available at each secondary data port.

21. The memory buffer of claim 18 wherein each secondary data port has the same number of data signal links.

22. The memory buffer of claim 18 wherein data is transmitted at a first rate through the primary data port and transmitted at a second rate through at least one of the secondary data ports, the first rate being different than the second rate.

* * * * *